US010873206B2

(12) United States Patent
Frey et al.

(10) Patent No.: US 10,873,206 B2
(45) Date of Patent: Dec. 22, 2020

(54) SYSTEM AND METHOD FOR POWER STORAGE AND DISTRIBUTION

(71) Applicant: SCHNEIDER ELECTRIC IT CORPORATION, West Kingston, RI (US)

(72) Inventors: James Walter Frey, Andover, MA (US); Jeffrey B. Samstad, Brookline, MA (US)

(73) Assignee: SCHNEIDER ELECTRIC IT CORPORATION, West Kingston, RI (US)

( * ) Notice: Subject to any disclaimer, the term of this patent is extended or adjusted under 35 U.S.C. 154(b) by 789 days.

(21) Appl. No.: 15/608,155

(22) Filed: May 30, 2017

(65) Prior Publication Data
US 2018/0351399 A1 Dec. 6, 2018

(51) Int. Cl.
*H02J 9/06* (2006.01)
*H02J 1/10* (2006.01)

(52) U.S. Cl.
CPC .............. *H02J 9/061* (2013.01); *H02J 1/102* (2013.01); *H02J 9/062* (2013.01)

(58) Field of Classification Search
CPC .................................................. H02J 9/06–08
See application file for complete search history.

(56) References Cited

U.S. PATENT DOCUMENTS

| 5,801,931 A * | 9/1998 | Kino | H02J 1/02 363/17 |
| 6,311,279 B1 * | 10/2001 | Nguyen | H02J 7/022 713/300 |
| 10,164,464 B1 * | 12/2018 | Ross | G06F 1/30 |
| 2002/0071292 A1 | 6/2002 | Aihara et al. | |
| 2003/0058595 A1 * | 3/2003 | Murabayashi | H02J 1/102 361/90 |
| 2008/0030078 A1 | 2/2008 | Whitted et al. | |

(Continued)

FOREIGN PATENT DOCUMENTS

WO 2013001548 A1 1/2013

OTHER PUBLICATIONS

Extended European Search Report from corresponding European Application No. 18175240.3 dated Sep. 10, 2018.

(Continued)

*Primary Examiner* — Rexford N Barnie
*Assistant Examiner* — David A Shiao
(74) *Attorney, Agent, or Firm* — Lando & Anastasi, LLP

(57) ABSTRACT

According to one aspect, embodiments of the invention provide a power system comprising an input power distribution circuit including a plurality of power connections, a first power supply coupled to a first power connection of the plurality of power connections, a scalable battery bank including at least a first battery module coupled to a second power connection of the plurality of power connections, the first battery module including a first battery and a first battery charger, the first battery charger and the first power supply being removable and interchangeable, and an output power distribution circuit coupled to the first power supply and the first battery and configured to provide output power derived from at least one of the first power supply and the first battery.

20 Claims, 6 Drawing Sheets

(56) References Cited

U.S. PATENT DOCUMENTS

| | | | |
|---|---|---|---|
| 2011/0133559 A1* | 6/2011 | Yamashita | G06F 11/2015 307/66 |
| 2011/0133560 A1* | 6/2011 | Yamashita | G06F 1/30 307/66 |
| 2012/0228944 A1 | 9/2012 | Koshin et al. | |
| 2014/0063752 A1 | 3/2014 | Sisler et al. | |
| 2014/0157008 A1* | 6/2014 | Ammu | G06F 1/30 713/300 |
| 2015/0076915 A1* | 3/2015 | Liang | H02J 9/062 307/66 |
| 2015/0177808 A1* | 6/2015 | Sarti | G06F 1/30 713/300 |
| 2015/0180232 A1 | 6/2015 | Mino et al. | |
| 2016/0043555 A1* | 2/2016 | Howell | G06F 1/263 307/23 |
| 2016/0241081 A1 | 8/2016 | Nandam et al. | |
| 2017/0047772 A1 | 2/2017 | Wang et al. | |
| 2017/0271874 A1* | 9/2017 | Luke | H02J 3/16 |
| 2017/0317510 A1* | 11/2017 | Banerjee | H02J 7/0024 |
| 2017/0373528 A1* | 12/2017 | Davis | G06F 1/3206 |
| 2019/0334377 A1* | 10/2019 | Abe | H02J 7/35 |

OTHER PUBLICATIONS

Notification of Transmittal of the International Search Report and the Written Opinion of the International Searching Authority from corresponding PCT/US2018/034884 dated Sep. 6, 2018.

* cited by examiner

SYSTEM AND METHOD FOR POWER STORAGE AND DISTRIBUTION

BACKGROUND OF THE INVENTION

Field of the Invention

At least one example in accordance with the present invention relates generally to intelligent energy storage and power distribution.

Discussion of Related Art

Solar, battery, and electric grid power systems are well known, including those that power wireless Internet Service Providers (ISPs) in remote locations. As the dependency on the Internet in emerging economies grows, the importance of constant and reliable Internet network access significantly increases. However, in many underdeveloped and/or developing countries the accessibility of reliable electric grid power systems remains limited, and restricts the availability of reliable Internet network access. Accordingly, many local ISPs rely on a combination of individually unreliable energy sources to power network components. Due to the physically distributed nature of the energy sources and the network components, as well as the inconsistent quality of the power received, it is crucial for network components to use local battery storage to satisfy availability demands.

SUMMARY

Aspects and embodiments are generally directed to intelligent power storage and distribution systems and methods. Examples of the aspects and embodiments discussed herein address the numerous power storage and energy consumption needs of remote network equipment with a single integrated power system. Particular implementations of the example power systems described herein address the variable energy capacity, flexible runtime capacity, and low start-up cost considerations that impact emerging economies, such as those in underdeveloped and/or developing countries.

According to an aspect, provided is a power system. In one example, the power system comprises an input power distribution circuit including a plurality of power connections, a first power supply coupled to a first power connection of the plurality of power connections, a scalable battery bank including at least a first battery module coupled to a second power connection of the plurality of power connections, the first battery module including a first battery and a first battery charger, wherein the first battery charger and the first power supply are removable and interchangeable, and an output power distribution circuit coupled to the first power supply and the first battery and configured to provide output power derived from at least one of the first power supply and the first battery.

According to certain examples, the output power distribution circuit further includes a common DC (direct current) bus line, the first power supply is coupled to and configured to provide a first DC voltage to the common DC bus line during a first mode of operation, and the first battery is coupled to and configured to provide a second DC voltage to the common DC bus line during a second mode of operation. In one example, the first battery charger is further coupled to the common DC bus line and configured to provide a third DC voltage to the common DC bus line during a third mode of operation. According to one example, the output power distribution circuit further includes at least a first output option card coupled to the common DC bus line and configured to provide a first adjustable output to a first load.

In some examples, the output power distribution circuit further includes at least a second output option card coupled to the common DC bus line and configured to provide a second adjustable output to a second load, the second adjustable output having a different output power configuration than the first adjustable output. According to one example, the output power distribution circuit further includes a cloud-enabled control circuit configured to monitor at least the first output option card and the second output option card. In one example, the first output option card further includes a Power over Ethernet injector.

According to certain examples, the power system further comprises a second power supply coupled to a third power connection of the plurality of power connections, and the second power supply is coupled in parallel with the first power supply. In one example, the scalable battery bank further includes a second battery module coupled to a fourth power connection of the plurality of power connections, the second battery module including a second battery and a second battery charger, and the second battery charger, the first battery charger, and the first power supply are removable and interchangeable.

In one example, the first battery module further includes a direct connection configured to receive input power from an alternate power source when the first battery module is removed from the power system. According to one example, the first battery charger includes a Maximum Power Point Tracker (MPPT) circuit. In one example, the output power distribution circuit further includes a power quality monitor configured to measure a power quality of input power received at the input power distribution circuit.

According to an aspect, provided is a method for power distribution. In one example, the method includes receiving input power at an input power distribution circuit coupled to at least a first power supply and a first battery module of a scalable battery bank, distributing the input power to at least the first power supply and a first battery charger of the first battery module, wherein the first battery charger and the first power supply are removable and interchangeable, providing a first DC (direct current) voltage to a common DC bus line from the first power supply during a first mode of operation, providing a second DC voltage to the common DC bus line from a first battery of the first battery module during a second mode of operation, and providing output power derived from at least one of the first power supply and the first battery.

According to certain examples, the method further comprises providing a third DC voltage to the common DC bus line from the first battery charger during a third mode of operation. In some examples, the method further comprises providing a first adjustable output to a first load from a first output option card coupled to the common DC bus line. According to one example, the method further comprises providing a second adjustable output to a second load from a second output option card coupled to the common DC bus line, and the second adjustable output has a different output power configuration than the first adjustable output. In one example, the method further comprises assigning a priority to the first load and the second load, the first adjustable output and the second adjustable output being provided according to the assigned priority.

In one example, receiving the input power at the input power distribution circuit includes receiving the input power from a solar panel power source. According to one example, the method further comprises monitoring a power quality of the input power, and switching between the first mode of operation and the second mode of operation based at least in part on the monitored power quality.

According to an aspect provided is a power system. In one example, the power system comprises an input power distribution circuit coupled to a power source to receive input power, a plurality of power supplies coupled to the input power distribution circuit to receive the input power, a scalable battery bank including a plurality of battery modules, each battery module including a battery and a battery charger, and each battery charger being interchangeable with at least one of the plurality of power supplies, wherein each battery module is coupled to the input power distribution circuit to receive the input power, an output power distribution circuit coupled to a plurality of loads, the output power distribution circuit being configured to deliver adjustable output power derived from at least one of the plurality of power supplies or at least one of the plurality of battery modules to each load of the plurality of loads, and an exterior enclosure positioned to encase the power system.

Still other aspects, embodiments, and advantages of these exemplary aspects and embodiments, are discussed in detail below. Moreover, it is to be understood that both the foregoing information and the following detailed description are merely illustrative examples of various aspects and embodiments, and are intended to provide an overview or framework for understanding the nature and character of the claimed aspects and embodiments. Any embodiment disclosed herein may be combined with any other embodiment in any manner consistent with at least one of the objectives, aims, and needs disclosed herein, and references to "an embodiment," "some embodiments," "an alternate embodiment," "various embodiments," "one embodiment" or the like are not necessarily mutually exclusive and are intended to indicate that a particular feature, structure, or characteristic described in connection with the embodiment may be included in at least one embodiment. The appearances of such terms herein are not necessarily all referring to the same embodiment.

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the invention. In the figures, each identical or nearly identical component that is illustrated in various figures is represented by a like numeral. For purposes of clarity, not every component may be labeled in every figure. In the figures.

DETAILED DESCRIPTION OF THE INVENTION

Figure 1:
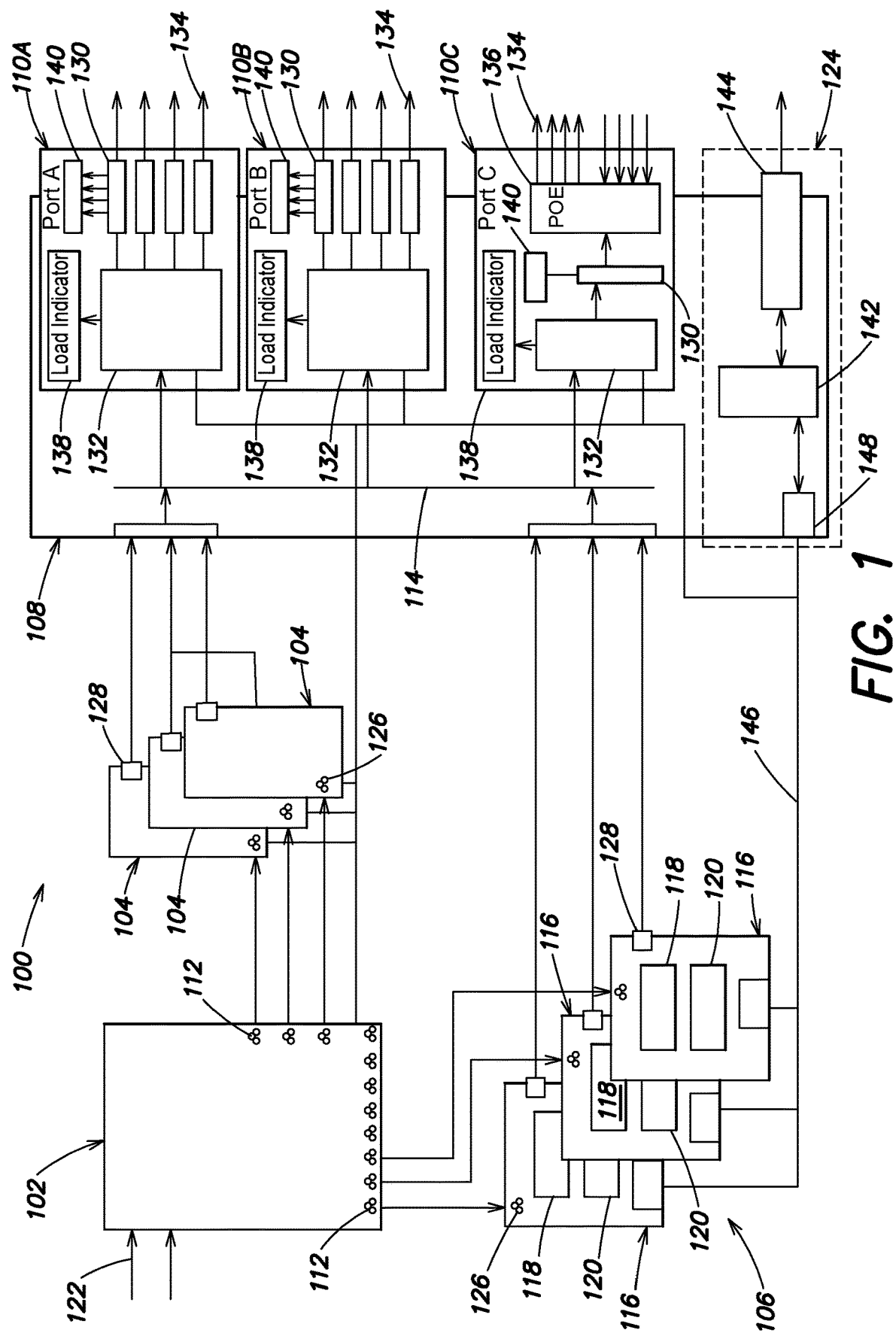
FIG. 1 is a block diagram of an example power system according to aspects of the invention.

Aspects and embodiments are generally directed to intelligent power storage and distribution systems and methods. Particular implementations of the example power systems described herein address the variable energy capacity, flexible runtime capacity, and low start-up cost considerations that impact emerging economies, such as those in underdeveloped and/or developing countries. In certain examples, the power systems described herein may include at least one power supply and at least one battery charger that are capable of being removed from the power system and interchanged. In such examples, the adaptability and interchangeability of the power supplies and battery chargers allows a user to dynamically scale and adapt the system over the lifecycle of use.

Examples of the systems and methods discussed herein are not limited in application to the details of construction and the arrangement of components set forth in the following description or illustrated in the accompanying drawings. The systems and methods are capable of implementation in other embodiments and of being practiced or of being carried out in various ways. Examples of specific implementations are provided herein for illustrative purposes only and are not intended to be limiting. In particular, acts, components, elements and features discussed in connection with any one or more examples are not intended to be excluded from a similar role in any other examples.

Also, the phraseology and terminology used herein is for the purpose of description and should not be regarded as limiting. Any references to examples, embodiments, components, elements or acts of the systems and methods herein referred to in the singular may also embrace embodiments including a plurality, and any references in plural to any embodiment, component, element or act herein may also embrace embodiments including only a singularity. References in the singular or plural form are no intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. In addition, in the event of inconsistent usages of terms between this document and documents incorporated herein by reference, the term usage in the incorporated features is supplementary to that of this document; for irreconcilable differences, the term usage in this document controls.

As described above, in underdeveloped and/or developing countries, and in rural areas, many local ISPs rely on a combination of individually unreliable energy sources to power network components. Due to the physically distributed nature of the energy sources and the network components, as well as the inconsistent quality of the power received, the variable energy capacity and runtime capacity required to operate the network components can differ drastically over the lifecycle of use. Moreover, existing power storage and distribution systems can be expensive to install, operate, and update when demands change.

Accordingly, aspects and embodiments provide an improved power system which may be incrementally and dynamically modified to accommodate varying power demands and runtime demands. Moreover, such aspects and embodiments may be incrementally scaled to provide a low cost power storage and distribution system that can be expanded or reduced during the lifecycle of the system. Various other advantages and benefits of the example power systems and methods described herein are discussed below with references to FIGS. 1-6.

FIG. 1 is a block diagram of an example power system 100 according to certain aspects and embodiments. Particular implementations of the example power system 100 shown in FIG. 1 may include an Uninterruptible Power Supply (UPS), for example. In the illustrated example, the power system 100 may include an input power distribution circuit 102, one or more power supplies 104, a scalable battery bank 106, and an output power distribution circuit 108. As shown, the scalable battery bank 106 may include one or more battery modules 116, and each battery module 116 may include a battery 118 and a battery charger 120, respectively. The example power system 100 is shown as including a first, second, and third power supply 104, and a first, second, and third battery module 116 for the convenience of illustration. In various embodiments, the power system 100 may include any suitable number of power supplies 104 and battery modules 116. Moreover, additional power supplies 104 and/or any suitable number of battery modules 116 may be added to the power system 100, and/or removed from the power system 100, depending on the particular load demands.

In certain embodiments, the input power distribution circuit 102 receives input power (shown generally as arrows 122) from a power source, and distributes the input power through a power connection 112 coupled to a power supply 104 or battery module 116. As illustrated, each power supply 104 and each battery module 116 may be electrically coupled with the input power distribution circuit 102 via a corresponding power connection 112. During a first mode of operation (e.g., a main power mode of operation), each power supply 104 provides a DC (direct current) voltage to the output power distribution circuit 108, which may power the load(s). During a second mode of operation (e.g., a back-up mode of operation), each battery 120 of a corresponding battery module 116 provides a DC voltage to the output power distribution circuit 108, which may power the load(s). Based on the power derived from the power supplies 104 or the batteries 120 (e.g., the received DC voltage), the output power distribution circuit 108 provides an adjustable output to the load(s). In certain embodiments, the output power distribution circuit 108 may include control circuitry, such as a cloud-enabled control circuit 124, configured to monitor the power system 100 and switch the power system 100 between the first mode of operation and the second mode of operation, or vice versa.

Though the elements of several views of the drawings herein may be shown and described as discrete elements in a block diagram and may be referred to as "circuitry" or "circuit," unless otherwise indicated, the elements may be implemented as one of, or a combination of, analog circuitry, digital circuitry, or one or more microprocessors executing software instructions. For example, the software instructions may include digital signal processing (DSP) instructions. Unless otherwise indicated, signal lines may be implemented as discrete analog or digital signal lines, as a single discrete digital signal line with appropriate signal processing, or as elements of a wireless communication system. Some of the processing operations may be performed by other analog or digital signal processing techniques and are included within the scope of this patent application. Unless otherwise indicated, control signals may be encoded in either digital or analog form. Conventional digital-to-analog or analog-to-digital converters may not be shown in the figures.

In various embodiments, the input power distribution circuit 102 may receive input power from a variety of power sources. For example, the input power distribution circuit 102 may include an AC (alternating current) power distribution board, and may receive an AC power input. In such an example, the input power distribution circuit 102 may be coupled to one or more sources of AC power, such as an electric power grid and/or an AC generator. However, in other examples, the input power distribution circuit 102 may include a DC power distribution board, and may receive a DC power input. In such examples, the input power distribution circuit 102 may be coupled to one or more sources of DC power, such as one or more solar panel power sources, one or more external battery systems, or one or more fuel cell systems.

As illustrated in FIG. 1, the input power distribution circuit 102 provides a common input to the one or more power connections 112. In certain embodiments, the input power distribution circuit 102 receives the input power at a power input connector, such as a covered hardwire terminal block and IEC 60320 inlet. Once the input power is received, the input power distribution circuit 102 may provide surge protection functionality and one or more filtering functions for each power supply 104 and battery module 116. In one example, the input power distribution circuit 102 may include a surge protection device, such as a metal oxide varistor (or other suitable surge protection device), arranged to limit the voltage applied to each power supply 104 and each battery module 116. According to certain embodiments, each power connection 112 of the input power distribution circuit 102 is a "touch-safe" power output connection, such as an IEC 60320 C13 or C14 appliance coupler.

As illustrated in FIG. 1, each power supply 104 (e.g., the first power supply, second power supply, and third power supply), is coupled to a corresponding power connection 112 of the input power distribution circuit 102 and configured to receive the input power therefrom. Each power supply 104 may be sized based on the expected load of the power system 100, and may range between a rated value of 40 W to 200 W. Each power supply 104 may be isolated from the other power supplies within the power system 100, and in certain embodiments, may be coupled in parallel to enable system scaling. That is, additional power supplies 104 may be added to the power system 100 to "rightsize" the peak power level of the power system 100.

For instance, one or more additional power supplies 104 may be independently added to the power system 100 to increase the peak power level. Likewise, one or more power supplies 104 may be independently removed from the power system 100 to decrease the peak power level. As discussed above, the modularity of each power supply 104 decreases the time required to repair the power system 100 in the event of system failure, in addition to allowing incremental system upgrades over the lifespan of the power system 100. According to certain examples, power supplies 104 may be independently removed, replaced, or added in real time during operation of the power system 100 without disruption to operation of the system 100.

During the first mode of operation, each power supply 104 provides a DC voltage to the output power distribution circuit 108. For example, each power supply 104 coupled to the input power distribution circuit 102 may receive a voltage having a value between 80 VAC and 280 VAC, and provide an output DC voltage having a value between 42 VDC and 56 VDC. While not explicitly illustrated in FIG. 1, in various embodiments, each power supply 104 may include additional circuit components to adjust the DC voltage to a desired value, such as a controllable AC/DC converter or a controllable DC/DC converter. In particular implementations, each power supply 104 may receive one or more control signals which instruct the power supply 104 to adjust the DC voltage provided to the output power distribution circuit 108. In such an embodiment, the control signals may include an analog or digital control signal generated by the cloud-enabled control circuit 124. As further discussed below in more detail, each power supply 104 may be coupled to a common DC bus line of the output power distribution circuit 108. While the control circuitry is described herein as including the cloud-enabled control circuit 124 in certain examples, in various other implementations, the control circuitry may include a local industrial controller (e.g., embedded microcontroller).

In various embodiments, the scalable battery bank 106 includes one or more battery modules 116 each including a battery 120 and a battery charger 118, respectively. In further examples, each battery module 116 may also include a battery monitoring circuit. Each battery charger 118 and battery monitoring circuit may be integrated within the corresponding battery module 116 to ensure that recharge time remains constant for each battery module 116 within the power system 100, regardless of the number of battery modules 116 included therein. Each battery module 116 (e.g., the first battery module, second battery module, and third battery module) is coupled to a corresponding power connection 112 of the input power distribution circuit 102 and configured to receive the input power therefrom. In particular, each input connection 112 may be coupled with the battery charger 118 of each battery module 120.

According to an example in which the input power includes input AC power, each battery charger 118 may include an AC/DC converter coupled to the battery monitoring circuit, and the respective battery 120. In response to receiving the input AC power, the battery charger 118 may store the converted DC power in one or more cells of the battery 120. According to certain other examples in which the input power includes input DC power, each battery charger 118 may include a DC/DC converter coupled to the battery monitoring circuit, and the respective battery 120. For example, each battery charger 118 may include a Maximum Power Point Tracking (MPPT) circuit. The MMPT circuit may track the electrical characteristics of the input power and adjust the load characteristics of the load to achieve the highest efficient power transfer between the source and the load.

Figure 2:
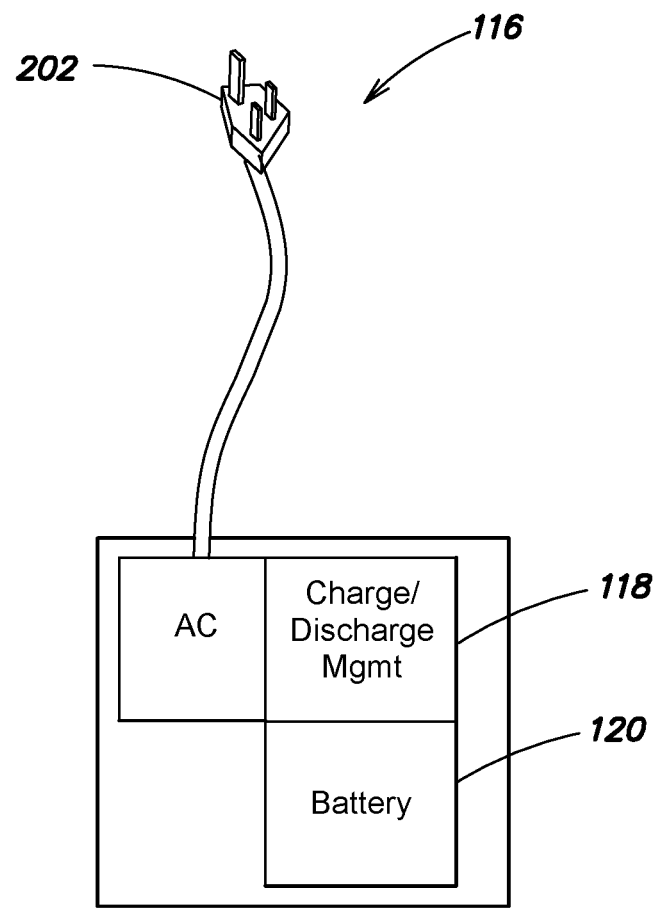
FIG. 2 is a block diagram of an example battery module of the example power system illustrated in FIG. 1, according to aspects of the invention.
Figure 3:
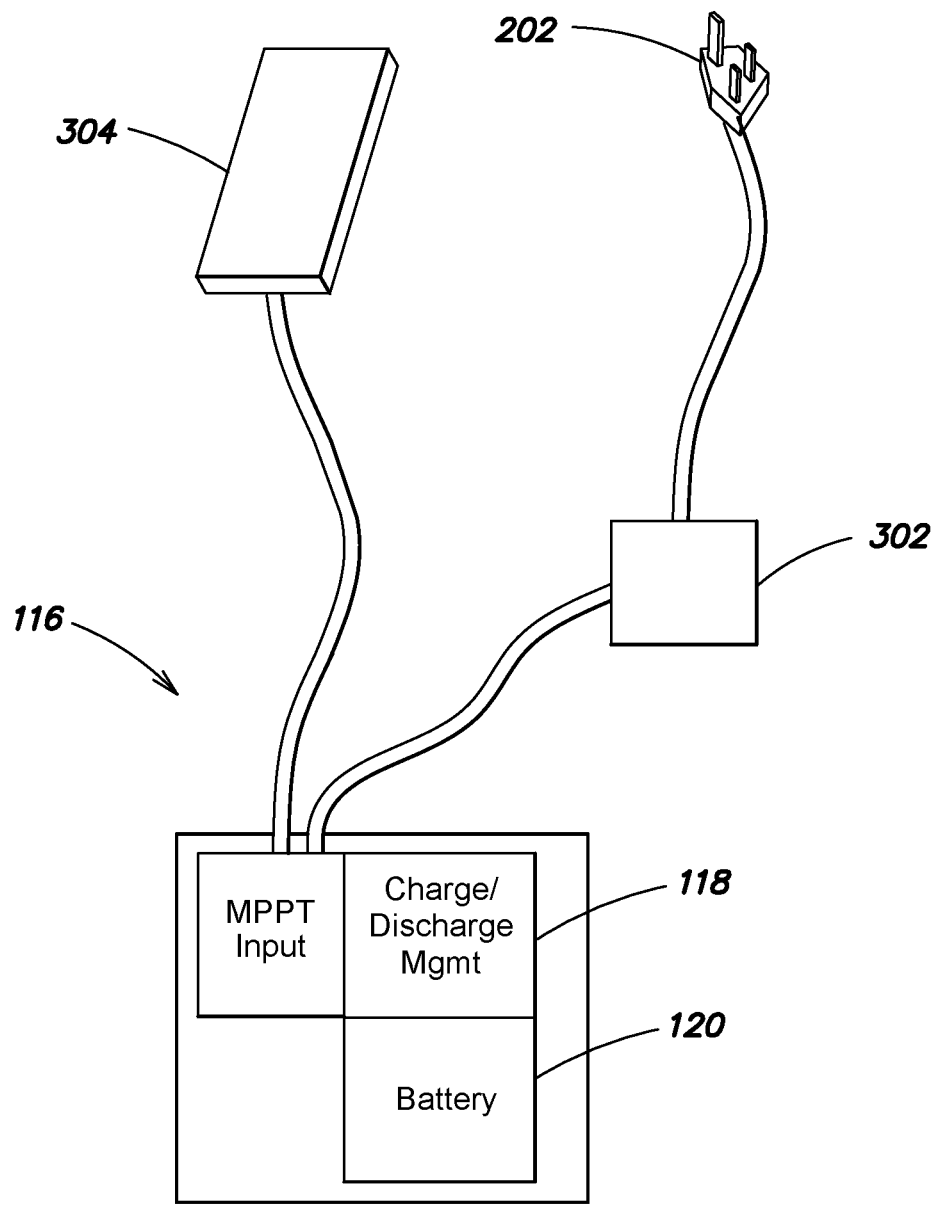
FIG. 3 is a block diagram of another example battery module of the example power system illustrated in FIG. 1, according to aspects of the invention.

Referring to FIG. 2, illustrated is one example of a battery module 116 shown in FIG. 1. In the shown example, the battery charger 118 is coupled with the battery monitoring circuitry and a direct connection 202 (e.g., power cable). The direct connection 202 may receive input power from an alternate power source when the corresponding battery module 116 is removed from the power system 100. Such an embodiment permits the battery charger 118 to recharge the battery 120 when the battery module 116 is removed from the power system 100. For example, the direct connection 202 may directly couple the battery charger 118 with a grid-connection power strip, a vehicle mounted AC inverter, or a generator having an AC power output. As discussed above, in certain embodiments each battery module 116 may include a battery charger 118 having a DC/DC converter. Accordingly, in at least one implementation, the direct connection 202 may include an AC helper circuit, such as an AC/DC converter to allow the battery module 116 to receive AC power when it has be removed from the power system 100. FIG. 3 shows one example of a battery module 116 including a direct connection 202 having an AC helper circuit 302. However, in certain other implementations, the direct connection 202 may directly couple the battery charger 118 with a source of DC power when it removed from the power system 100, such as a solar panel power source 304.

Referring to FIG. 1, the battery monitoring circuit of each battery module 116 may perform one or more operations to track the performance and operation of the battery module 116 (e.g., the battery charger 118 and the battery 120), such as a charger status, a state of charge, one or more temperature, a charge/discharge count, and/or other historical performance data. In one particular example, the battery monitoring circuit, and/or the battery charger 118 of a corresponding battery module 116, may authenticate the battery module 116 in response to one or more handshake requests from the could-enabled control circuit 124. The cloud-enabled control circuit 124 may send a handshake request any time a new battery module 116 is coupled to the input power distribution circuit 102 and/or the output power distribution circuit 108. In such an implementation, the battery charger 118 and/or the battery monitoring circuit prevent the battery 120 from discharging unless it has been authenticated and coupled with a validated load.

According to certain examples, each battery 120 may include a lithium iron phosphate (LiFePO4) battery. During the second mode of operation, each battery 120 of a corresponding battery module 116 may discharge to provide a DC voltage to the output power distribution circuit 108. For instance, the cloud-enabled control device 124 may control the power system 100 to switch to the second mode of operation, disconnect the one or more power supplies 104 from the output power distribution circuit 108, and discharge the battery 120 of each battery module 116. In various examples, each battery 120 may include 16 cells in series, each cell capable of providing a nominal voltage of 3.2V for a rated value of about 300 Wh of energy. However, in various other examples, other suitable batteries may used, and the particular characteristics of the batteries 120 may depend on the performance demands of the power system 100.

As discussed with reference to the power supplies 104, each battery module 116 may be independently removed, replaced, or added to the scalable battery bank 106. In particular, each battery module 116 may be removed, replaced, or added in real time during operation of the power system 100 without disruption to the operation of the system 100. Addition of one or more additional battery modules 116 to the scalable battery bank 106 may increase the runtime of the scalable battery bank 106, and allow a user to incrementally increase the performance of the system 100. That is, additional battery modules 116 may be added to the power system 100 to "rightsize" the runtime of the scalable battery bank 106. For instance, one or more additional battery modules 116 may be independently added to the power system 100 to increase the runtime, or one or more battery modules 116 may be independently removed from the power system 100 to decrease the runtime.

In particular examples, each battery charger 118 may also be removed or replaced from a battery module 116. Specifically, each battery charger 118 may be interchangeable with each power supply 104. Each power supply 104 and each battery charger 118 may have a series of substantially identical input connectors 126 and output connectors 128 (e.g., an IEC 60320 C5 or C6 appliance coupler), that allow each to be coupled within the power system 100 in the position of the other. That is, each of the power supplies 104 may be removed and swapped with the battery chargers 118 at the discretion of the user, and each of the battery chargers 118 may be removed and swapped with the power supplies 104 at the discretion of the user. Moreover, the modularity and interchangeability of the battery chargers 118 and power supplies 104 decreases the time required to repair the power system 100 in the event of system failure and reduces the complexity of spare parts.

While in certain examples the power supplies 104 and the batteries 120 may be the principle source of supplying power (e.g., a DC voltage) to the output power distribution circuit 108, in certain other implementations, each battery charger 118 may also power the output power distribution circuit 108. For example, during a third mode of operation each battery charger 118 may directly provide a DC voltage to the output power distribution circuit 108. Accordingly, the battery charger 118 of each battery module 116 may act as redundant power source to power the output power distribution circuit 108 when the one or more power supplies 104 or the one or more batteries 120 fail.

As shown, the output power distribution circuit 108 may be coupled to the one or more of the power supplies 104, the batteries 120, and/or the battery chargers 118. Specifically, a common DC bus line 114 of the output power distribution circuit 108 may be coupled with the power supplies 104, the batteries 120, and the battery chargers 118 to receive a DC voltage therefrom. Coupled to the common DC bus line 114, the output power distribution circuit 108 may include one or more output option cards 110A, 110B, 110C (referred to herein collectively as output option cards 110). Each output option card 110 may be removable from a corresponding port of the output power distribution circuit 108, and may provide an adjustable output to a load. Specifically, each output option card 110 may provide an adjustable output having a different output power configuration. For example, in the illustrated example of FIG. 1, the output power distribution circuit 108 is shown as including a first output option card 110A for providing a first DC voltage (e.g., 12V, 24V, 48V, or 56V), a second output option card 110B for providing a second DC voltage (e.g., 12V, 24V, 48V, or 56V), and a third output option card 110C including a Power over Ethernet (PoE) injector for providing a PoE output (e.g., PoE Midspan power (IEEE 802.af or IEEE 802.at)).

As further illustrated in FIG. 1, each output option card 110 may include a power limit module 130 interposed between a DC/DC converter 132 and one or more output connectors 134. According to certain examples, each power limit module 130 may include a current sensor, current threshold detection circuit, and a variable resistance that dramatically increases in electrical resistance if a sensed current exceeds a threshold. In other examples, each power limit module 130 is a series positive-temperature coefficient (PTC) variable resistor that dramatically increases in electrical resistance if current flowing through the PTC exceeds a certain threshold.

While FIG. 1 shows the first output option card 110A and the second output option card 110B both including four output connectors 134, any suitable number of output connectors 134 may be used. In further examples, and as illustrated with reference to the third output option card 110C, each output option card 110 may include a PoE port 136 having a series of Ethernet inputs and a series of PoE outputs. For example, FIG. 1 illustrates the PoE port 136 as having four 10/100 Ethernet inputs and four 10/100 PoE outputs. In further examples, each output option card 110 may include a load indicator 138, a trip reset circuit 140, and/or an overcurrent protection circuit (not shown). Each load indicator 138 may indicate the presence/absence of an output voltage within a specified range at the corresponding output connector 134 and/or the amount of power being supplied, individual and/or in aggregate, at the output connectors 134, and/or other power quality or system status information. While described in one example as being capable of providing a PoE output, in various other implementations, one or more of the output option cards 110 may be capable of providing a PoE+ or full power PoE output. Each output option card 110 may be removed, replaced, or added to the power system 100 to further customize the power system 100 based on load demands.

In certain embodiments, the output power distribution circuit 108 further includes control circuitry to monitor and control each of the output option cards 110, in addition to other components of the power system 100. For instance, FIG. 1 shows the output power distribution circuit 108 including a cloud-enabled control circuit 124 configured to enable remote control and operation of at least the first output option card 110A, the second output option card 110B, and the third output option card 110C. In particular implementations, the cloud-enabled control circuit 124 may include a controller 142 coupled via a network connection card 144 (e.g., SNMP or Ethernet) to a cloud service provider. One or more control signal lines 146 may couple the input power distribution circuit 102, the power supplies 104, the battery modules 116 (e.g., battery chargers 118 and batteries 120), and the output option cards 110 with a device interface 148 of the cloud-enabled control circuit 124.

In various embodiments, the controller 142 is configured to exchange information, including power system 100 identifying information, with the cloud service. The controller 142 may be further configured to provide a user interface via a webserver, allowing a user to interact with the exchanged information and remotely control one or more aspects of the power system 100. For example, the exchanged information may include input power quality (e.g., input AC power quality or input DC power quality), adjustable output power information (e.g., current and/or voltage), battery module charge/discharge status, system temperature information, and/or activity information, among other information. In further embodiments, the cloud-enabled control circuit 124 may receive one or more commands from the cloud service and generate one or more control signals to provide system switching, power cycling, reset switching, or other control operations for the one or more output option cards 110.

For example, the cloud-enabled control circuit 124 may provide one or more control signals to switch the power system 100 between any of the first mode, the second mode, and the third mode of operation. Specifically, the cloud-enabled control circuit 124 may be coupled and in communication with a power quality sensor positioned within the input power distribution circuit 102. The cloud-enabled control circuit 124 may provide one or more switching signals based at least in part on a quality of the monitored input power. In particular examples, the cloud-enabled control circuit 124 may also assign a priority to the one or more loads coupled to the output power distribution circuit 108. In such an embodiment, the each output option card 110 may provide an adjustable output based at least in part on the assigned priority. That is, the output option cards 110 with a comparatively greater priority may take preference over those with a comparatively lower priority when the available input power or battery power is reduced, or when the available runtime is limited.

According to certain examples, the controller 142 within the cloud-enabled control circuit 124 may include a processor, data storage, a device interface, a user interface, and a communication interface. The processor may be coupled to the data storage, the device interface, and the user interface. The processor performs a series of instructions that result in manipulated data which are stored in and retrieved from the data storage. According to a variety of examples, the processor is a commercially available processor such as a processor manufactured by INTEL, AMD, MOTOROLA, or FREESCALE. However, the processor may be any type of processor, multiprocessor or controller, whether commercially available or specially manufactured. For instance, according to one example, the processor may include an MPC823 microprocessor manufactured by MOTOROLA.

In additional examples, the processor may be configured to execute an operating system. The operating system may provide platform services to application software. These platform services may include inter-process and network communication, file system management and standard database manipulation. One or more of many operating systems may be used, and examples are not limited to any particular operating system or operating system characteristic. In some examples, the processor may be configured to execute a real-time operating system (RTOS), such as RTLinux, or a non-real time operating system, such as BSD or GNU/Linux.

The data storage includes a computer readable and writeable nonvolatile data storage medium configured to store non-transitory instructions and data. In addition, the data storage includes processor memory that stores data during operation of the processor. In some examples, the processor memory includes a relatively high performance, volatile, random access memory such as dynamic random access memory (DRAM), static memory (SRAM), or synchronous DRAM. However, the processor memory may include any device for storing data, such as a non-volatile memory, with sufficient throughput and storage capacity to support the functions described herein. Further, examples are not limited to a particular memory, memory system, or data storage system.

The instructions stored on the data storage may include executable programs or other code that can be executed by the processor. The instructions may be persistently stored as encoded signals, and the instructions may cause the processor to perform the functions described herein. The data storage may include information that is recorded, on or in, the medium, and this information may be processed by the processor during execution of instructions. The data storage may also include, for example, specification of data records for input power quality (e.g., input AC power quality or input DC power quality), adjustable output power (e.g., current and/or voltage), battery module charge/discharge status, system temperature, and/or activity, among other information. The medium may, for example, be optical disk, magnetic disk or flash memory, among others, and may be permanently affixed to, or removable from, the treatment controller.

In various embodiments, the controller 142 includes several device interface components. Each of these device interface components is configured to exchange data with one or more power system components that may be located within an exterior enclosure of the power system 100, or elsewhere. The device interface components used by the interfaces may include hardware components, software components or a combination of both. Within each device interface, these components physically and logically couple the controller 142 to the components of the power system 100. This physical and logical coupling enables the controller 142 to communicate with and, in some instances, power or control the operation of the power system components. In addition to the power system components illustrated in FIG. 1, these power system components may include various sensors, switches, and computer networking devices.

According to various examples, the hardware and software components of the device interfaces implement a variety of coupling and communication techniques. In some examples, the device interfaces use leads, cables or other wired connectors as conduits to exchange data between the controller and the power system components. In other examples, the device interfaces communicate with power system components using wireless technologies such as radio frequency or infrared technology. The software components included in the device interfaces enable the processor to communicate with power system components. These software components may include elements such as objects, executable code, and populated data structures. Together, these software components provide software interfaces through which the processor can exchange information with the power system components. Moreover, in at least some examples where one or more power system components communicate using analog signals, the device interfaces further include device interface components configured to convert analog information into digital information, and vice versa, to enable the processor to communicate with power system components.

In various examples, the components of the communication interface couple the processor via the network connection card 144 to one or more external systems. According to a variety of examples, the communication interface supports a variety of standards and protocols, examples of which include USB, TCP/IP, ETHERNET, BLUETOOTH, ZIGBEE, CAN-bus, IP, IPV6, UDP, DTN, HTTP, HTTPS, FTP, SNMP, CDMA, NMEA and GSM. It is appreciated that the communication interface of the controller 142 may enable communication between other devices within a certain range.

The user interface may include a combination of hardware and software components that allow the controller 142 to directly communicate with an external entity, such as a user. These components may be configured to receive information from actions such as activation of a button or keypad on an exterior surface of an enclosure of the power system 100. In addition, the components of the user interface can provide information to external entities. Examples of the components that may be employed within the user interface include keypads, buttons, microphones, touch screens, display screens, and speakers.

Figure 4:
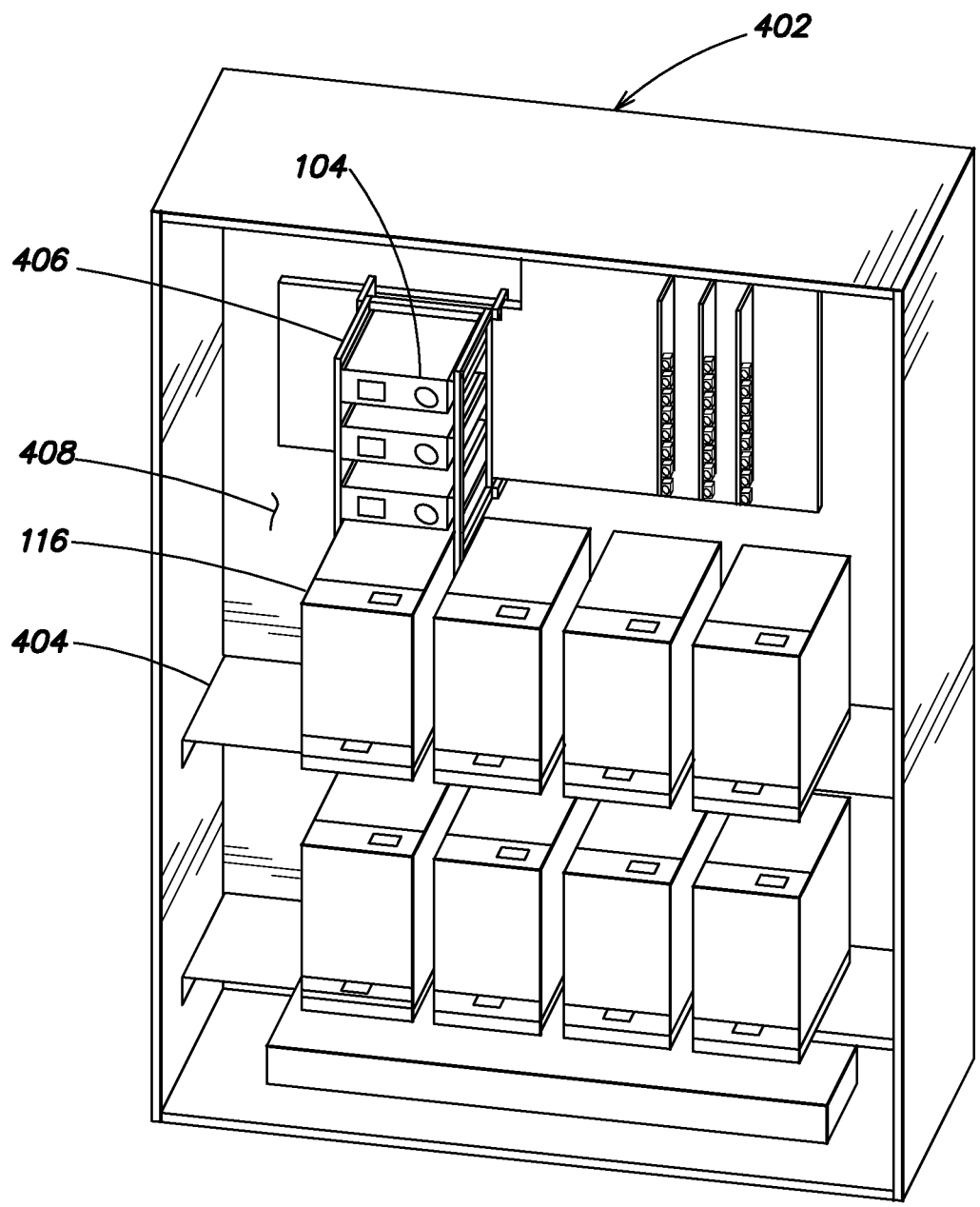
FIG. 4 is an example structural layout of the example power system illustrated in FIG. 1, according to aspects of the invention.
Figure 5:
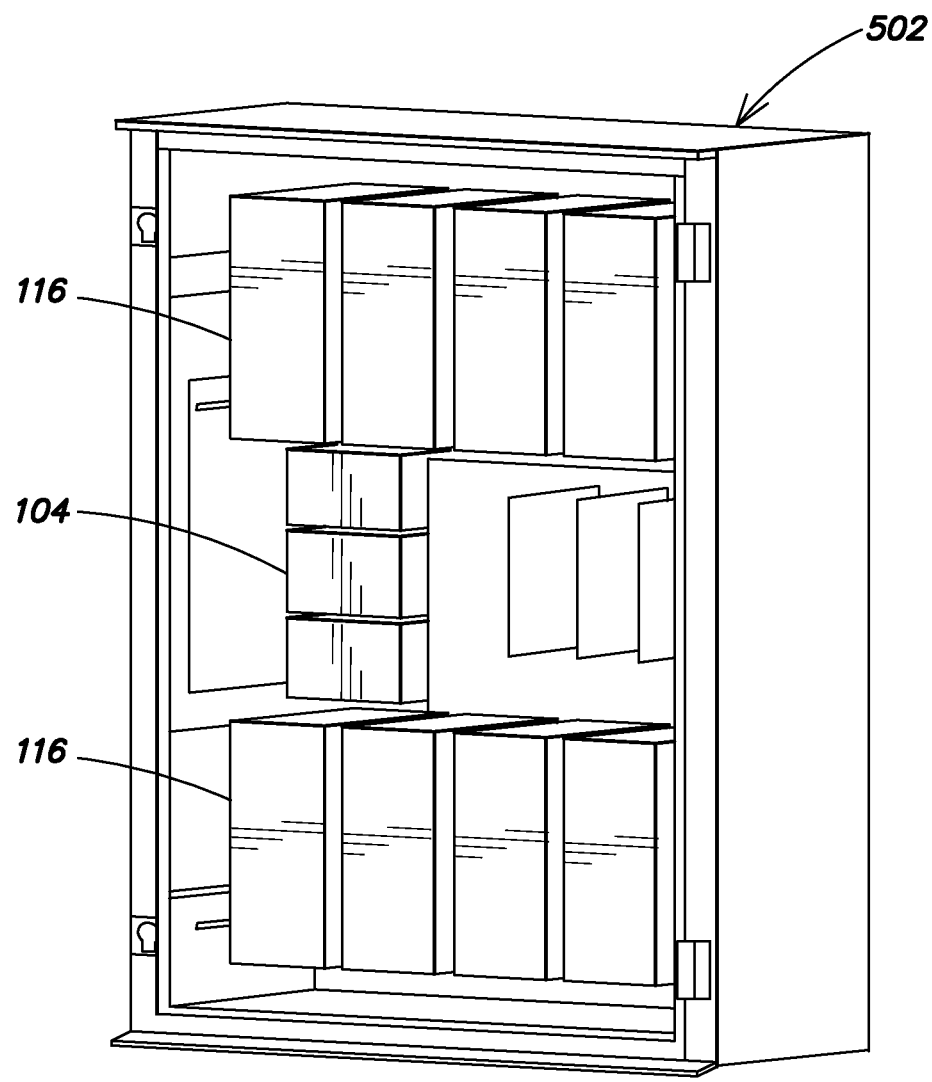
FIG. 5 is another example structural layout of the example power system illustrated in FIG. 1, according to aspects of the invention.

Referring to FIG. 4, in certain embodiments the power system 100 may be encased within an exterior enclosure to protect the power system 100 from environmental exposure. FIG. 4 illustrates an example structural layout of the power system 100 within one such enclosure 402. As shown, components of the power system 100, such as the power supplies 104 and battery modules 116, may be removably coupled to one or more racks mounted to an interior surface of the enclosure 402. In the example enclosure illustrated in FIG. 4, each battery module 116 is mounted to a shelf 404 extending across an interior cross-section of the enclosure 402, and each power supply 104 is mounted to a suspended rack structure 406. Other components of the power system 100, such as the input power distribution circuit 102 and the output power distribution circuit 108, may be coupled to the interior surface 408 of the enclosure 402. While not shown in FIG. 4, the enclosure 402 may include an access panel, such as a hinged door, which allows access to the interior of the enclosure 402 and the shown power system 100 components. FIG. 5 illustrates another example arrangement of components of the power system 100 (e.g., power supplies 104 and battery modules 116) within an example exterior enclosure 502.

Figure 6:
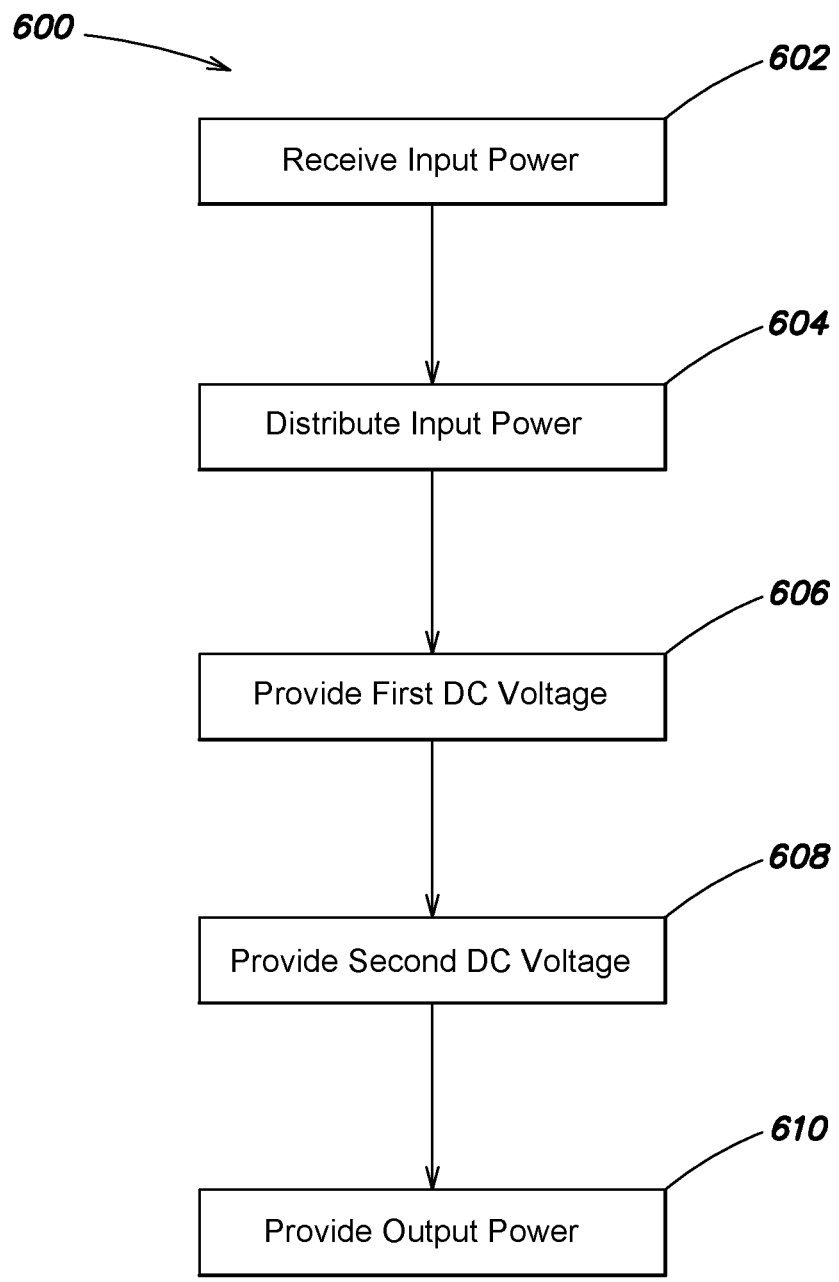
FIG. 6 is an example process flow for a method of distributing power, according to aspects of the invention.

As described above with reference to FIG. 1, several embodiments perform processes that store and distribute power. In some embodiments, these processes are executed by a power system, such as the system 100 described above with reference to FIG. 1. One example of such a process is illustrated in FIG. 6. According to this example, the process 600 includes the acts of receiving input power, distributing the input power, providing a first DC voltage, providing a second DC voltage, and providing output power. The process illustrated in FIG. 6 is described with continuing reference to the power system 100, and components thereof, illustrated in FIG. 1.

In act 602, the process 600 may include receiving input power at an input power distribution circuit coupled to a first power supply and a battery module. As shown in FIG. 1, the battery module may be one of many battery modules included within a scalable battery bank. In certain examples, the process 600 may include receiving AC input power from one or more sources of AC power, such as a power grid or a generator. However, in various other examples, the process 600 may include receiving DC input power from one or more sources of DC power, such as a solar panel power source.

In response to receiving input power, the process 600 may include the act of distributing the input power to at least one power supply and/or one or more battery chargers of the power system (act 604). As discussed with reference to the example power system illustrated in FIG. 1, distributing the input power to the power supplies and/or battery chargers may include providing the input power as a common input to the one or more power connections. Each of the power connections may couple input power distribution circuit with a corresponding battery charger or power supply. As further discussed above with reference to FIG. 1, in various embodiments each power supply and each power charger may be removable and interchangeable. Accordingly, certain examples of the process 600 may also include the act of removing one or more of the power supplies and/or or one or more of the battery chargers. In such examples, the process 600 may further include the act of swapping, replacing, or adding a power supply or battery charger to the power system.

Referring to act 606, the process 600 may include providing a DC voltage to a common DC bus line from the one or more power supplies, during a first mode of operation. Similarly, in act 608 the process 600 may include providing a DC voltage to the common DC bus line from the battery of one or more battery modules, during a second mode of operation. In act 610, the process 600 may include providing output power derived from at least one of the power supplies and at least one of the batteries (e.g., the DC voltage provided to the common DC bus line). According to certain implementations, the act of providing output power may include providing and adjustable output from a configurable output option card. While not explicitly illustrated in the process flow of FIG. 6, in certain other examples, the process 600 may include additional acts and processes as further discussed with reference to the example power system 100 illustrated in FIG. 1.

Accordingly, various aspects and examples discussed herein address the numerous power storage and energy consumption needs of remote network equipment with a single integrated power system. Particular implementations of the example power systems described herein address the variable energy capacity, flexible runtime capacity, and low start-up cost considerations that impact emerging economies, such as those in underdeveloped and/or developing countries.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A power system comprising:
    an input power distribution circuit including an input power connection and a plurality of output power connections, the input power distribution circuit being configured to distribute input power to the plurality of output power connections;
    a first power supply having a power supply input coupled to a first output power connection of the plurality of output power connections, and having a power supply output separate from the power supply input, the first power supply comprising a controllable converter configured to receive a control signal from a control circuit of the power system;
    a scalable battery bank including at least a first battery module coupled to a second output power connection of the plurality of output power connections, the first battery module including a first battery and a first battery charger, wherein the first battery charger and the first power supply comprise substantially identical input and output power connectors, wherein the first battery charger and the first power supply are removable and interchangeable with each other, and wherein the first battery module includes a battery input coupled to the second output power connection and includes a battery output separate from the battery input; and
    an output power distribution circuit coupled to the power supply output of the first power supply and the battery output of the first battery module and configured to provide output power derived from at least one of the first power supply and the first battery.

2. The power system of claim 1, wherein the output power distribution circuit further includes a common DC (direct current) bus line, wherein the first power supply is coupled to and configured to provide a first DC voltage to the common DC bus line during a first mode of operation, and wherein the first battery is coupled to and configured to provide a second DC voltage to the common DC bus line during a second mode of operation.

3. The power system of claim 2, wherein the first battery charger is further coupled to the common DC bus line and configured to provide a third DC voltage to the common DC bus line during a third mode of operation.

4. The power system of claim 2, wherein the output power distribution circuit further includes at least a first output option card coupled to the common DC bus line and configured to provide a first adjustable output to a first load.

5. The power system of claim 4, wherein the output power distribution circuit further includes at least a second output option card coupled to the common DC bus line and configured to provide a second adjustable output to a second load, the second adjustable output having a different output power configuration than the first adjustable output.

6. The power system of claim 5, wherein the output power distribution circuit further includes a cloud-enabled control circuit configured to monitor at least the first output option card and the second output option card.

7. The power system of claim 5, wherein the first output option card further includes a Power over Ethernet injector.

8. The power system of claim 1, further comprising a second power supply coupled to a third output power connection of the plurality of output power connections, wherein the second power supply is coupled in parallel with the first power supply.

9. The power system of claim 1, wherein the scalable battery bank further includes a second battery module coupled to a fourth output power connection of the plurality of output power connections, the second battery module including a second battery and a second battery charger, and wherein the second battery charger, the first battery charger, and the first power supply are removable and interchangeable.

10. The power system of claim 1, wherein the first battery module further includes a direct connection configured to receive input power from an alternate power source when the first battery module is removed from the power system.

11. The power system of claim 1, wherein the first battery charger includes a Maximum Power Point Tracker (MPPT) circuit.

12. The power system of claim 1, wherein the output power distribution circuit further includes a power quality monitor configured to measure a power quality of input power received at the input power distribution circuit.

13. A method for power distribution, the method comprising:
receiving input power at an input power connection of an input power distribution circuit having a plurality of output power connections coupled to at least a first power supply and a first battery module of a scalable battery bank, wherein the first power supply comprises a controllable converter configured to receive a control signal from a system control circuit;
distributing the input power to at least the first power supply and a first battery charger of the first battery module, wherein the first battery charger and the first power supply comprise substantially identical input and output power connectors, wherein the first power supply and the first battery charger are removable and interchangeable with each other, and wherein distributing the input power to the first battery charger includes providing power from an output power connection of the plurality of output power connections to a battery input of the first battery module;
providing a first DC (direct current) voltage to a common DC bus line from the first power supply during a first mode of operation;
providing a second DC voltage to the common DC bus line from a first battery of the first battery module during a second mode of operation at a battery output of the first battery module, the battery output being separate from the battery input; and
providing output power derived from at least one of the first power supply and the first battery.

14. The method of claim 13, further comprising providing a third DC voltage to the common DC bus line from the first battery charger during a third mode of operation.

15. The method of claim 13, further comprising providing a first adjustable output to a first load from a first output option card coupled to the common DC bus line.

16. The method of claim 15, further comprising providing a second adjustable output to a second load from a second output option card coupled to the common DC bus line, wherein the second adjustable output has a different output power configuration than the first adjustable output.

17. The method of claim 16, further comprising assigning a priority to the first load and the second load, the first adjustable output and the second adjustable output being provided according to the assigned priority.

18. The method of claim 13, wherein receiving the input power at the input power distribution circuit includes receiving the input power from a solar panel power source.

19. The method of claim 13, further comprising:
monitoring a power quality of the input power; and
switching between the first mode of operation and the second mode of operation based at least in part on the monitored power quality.

20. A power system comprising:
an input power distribution circuit having an input power connection coupled to a power source to receive input power, and a plurality of output power connections;
a plurality of power supplies each respectively coupled to a respective output power connection of the plurality of output power connections to receive the input power, and each having a respective power supply output, each power supply respectively comprising a controllable converter configured to receive a control signal from a control circuit of the power system;
a scalable battery bank including a plurality of battery modules, each battery module including a battery and a battery charger, and each battery charger comprising substantially identical input and output power connectors with at least one of the plurality of power supplies, wherein each battery charger is interchangeable with the at least one of the plurality of power supplies, and wherein each battery module includes a respective battery input coupled to a respective output power connection of the plurality of output power connections to receive the input power, and includes a battery output separate from the battery input;
an output power distribution circuit coupled to the battery outputs, the power supply outputs, and a plurality of loads, the output power distribution circuit being configured to deliver adjustable output power derived from at least one of the plurality of power supplies or at least one of the plurality of battery modules to each load of the plurality of loads; and
an exterior enclosure positioned to encase the power system.

* * * * *